United States Patent [19]

Bond et al.

[11] Patent Number: 4,780,200
[45] Date of Patent: Oct. 25, 1988

[54] WATER PURIFICATION APPARATUS

[75] Inventors: Graham Bond, High Wycombe; Anthony van Tullekin, London, both of England

[73] Assignee: Elga Ltd., Buckinghamshire, England

[21] Appl. No.: 897,418

[22] Filed: Aug. 18, 1986

[30] Foreign Application Priority Data

Aug. 22, 1985 [GB] United Kingdom ............... 8521079

[51] Int. Cl.$^4$ ........................... A61L 2/10; C02F 1/32
[52] U.S. Cl. ................................... 210/194; 210/252; 210/748; 250/432 R; 422/24
[58] Field of Search ............... 210/192, 194, 748, 252; 250/430, 432 R, 433, 435, 436; 422/24; 222/510, 518, 394

[56] References Cited

U.S. PATENT DOCUMENTS

| 2,028,256 | 7/1934 | Stevens et al. | 422/24 |
| 3,221,946 | 12/1965 | Riley | 222/510 |
| 4,276,256 | 6/1981 | Karamian | 422/24 |
| 4,342,915 | 8/1982 | Karamian | 422/24 |
| 4,599,171 | 7/1986 | Padilla et al. | 210/257.2 |
| 4,615,799 | 10/1986 | Mortensen | 422/24 |

FOREIGN PATENT DOCUMENTS

| 056855 | 8/1982 | European Pat. Off. |
| 096377 | 12/1983 | European Pat. Off. |
| 1294412 | 10/1972 | United Kingdom |
| 2022978 | 12/1979 | United Kingdom |

Primary Examiner—Richard V. Fisher
Assistant Examiner—Richard D. Jordan
Attorney, Agent, or Firm—Sixbey, Friedman, Leedom & Ferguson

[57] ABSTRACT

Water purification apparatus includes a housing 10 which contains water purification materials. Liquid which has been purified can be extracted via a manually operable dispensing element 16 which is coupled to the main housing by a flexible conduit 14. The element 16 can be supported with its nozzle in a receptacle 17 in the housing 10 where it can be irradicated by ultra violet radiation.

7 Claims, 4 Drawing Sheets

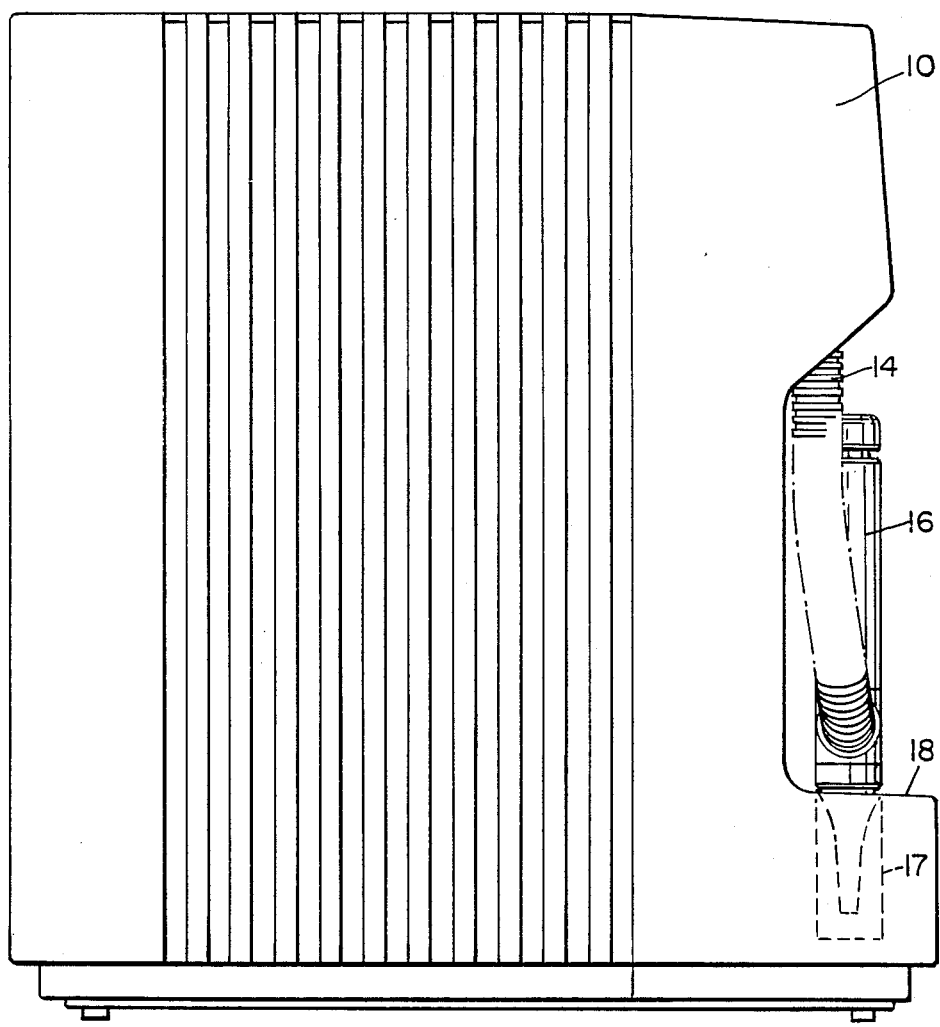

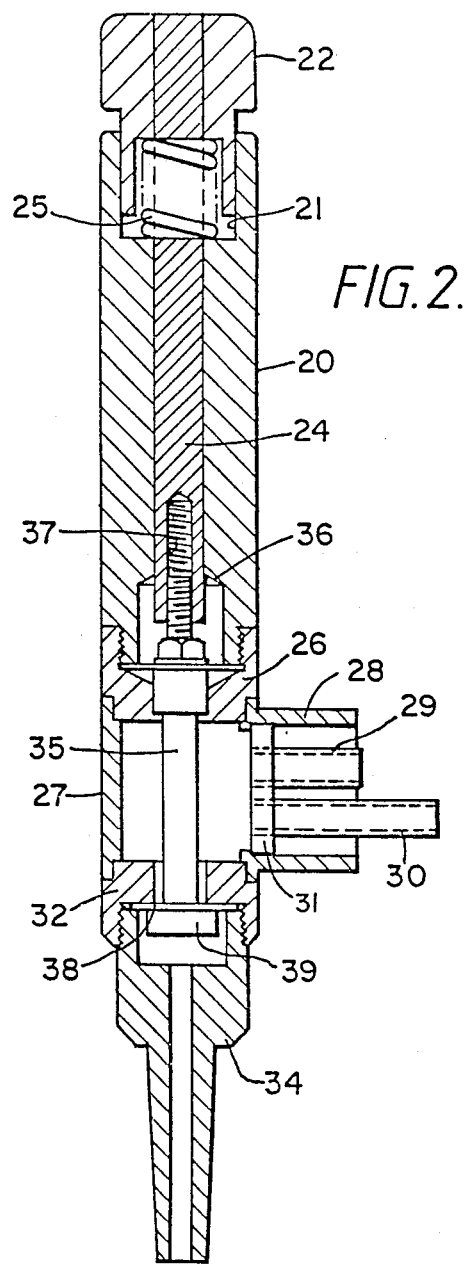

WATER PURIFICATION APPARATUS

TECHNICAL FIELD

This invention relates to liquid purification apparatus and particularly, but not exclusively, relates to water purification apparatus.

BACKGROUND ART

Highly purified water is required in many applications. Known purification apparatus usually comprises a housing which accommodates purification material such as ion exchange resins and reverse osmosis membranes. The housing includes an inlet by means of which water can be fed to the purification medium and an outlet through which the purified water can be extracted. In the known apparatus the outlet usually forms part of the main housing and is therefore located in very close proximity to the main housing in order to prevent recontamination of the purified water. Such apparatus has limitations since the outlet may not be easily accessible. Another problem with the known apparatus concerns the valve which controls flow through the outlet. The valve is usually designed to reduce re-contamination of the water to a minimum but this can lead to difficulties in achieving an accurate flow rate, thus making it difficult to extract precisely defined volumes of liquid.

SUMMARY OF INVENTION

An object of the present invention is to provide purification apparatus which removes or alleviates the above problems.

According to the present invention there is provided liquid purification apparatus which comprises a main housing accommodating liquid purification means, an inlet to said main housing for liquid to be purified, an outlet from said main housing and a manoeuverable dispensing element coupled to said outlet by an elongate flexible coupling.

The dispensing element may include a manually operable valve. The valve may be adjustable to control the flow rate therethrough. The valve may be arranged so that it can be locked in an open position.

The housing may include a receptacle for receiving said dispenser. The apparatus may include means for decontaminating the dispensing element disposed adjacent said receptacle. The decontamination means may comprise means for irradiating said dispenser with ultra-violet radiation.

BRIEF DESCRIPTION OF DRAWINGS

The invention will be described now by way of example only with with particular reference to the accompanying drawings. In the drawings:

FIG. 1a is a side elevation of water purification apparatus in accordance with the present invention;

FIG. 2 is a sectional view of the dispensing element of the apparatus of FIG. 1.

BEST MODE FOR CARRYING OUT THE INVENTION

Figure 1B:
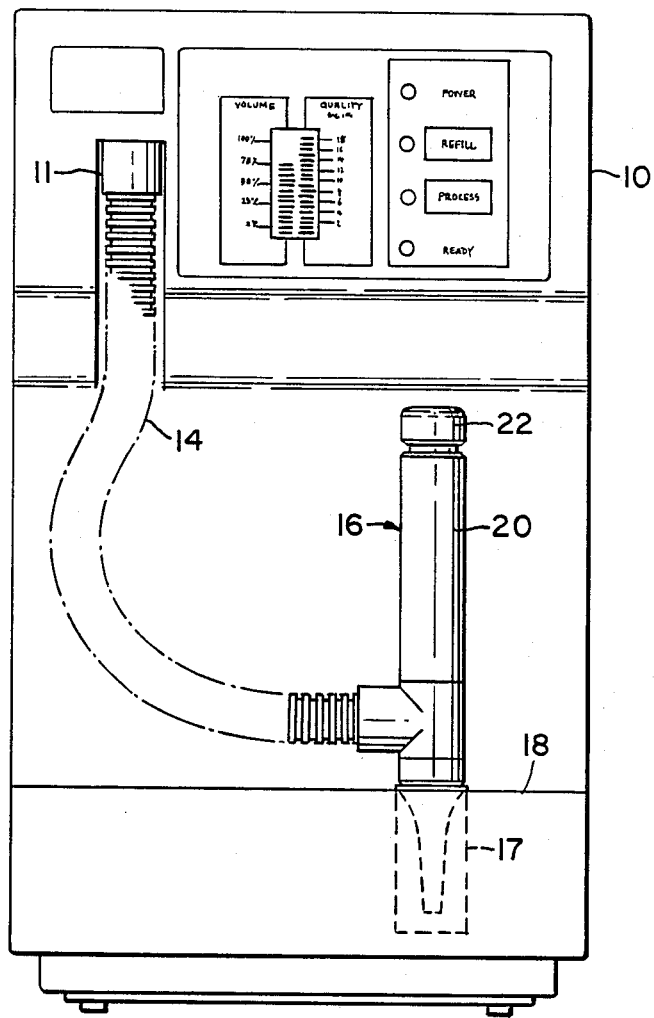
FIG. 1b is a front view of the apparatus.

Referring to FIG. 1 water purification apparatus comprises a main housing which is indicated generally at 10. The housing includes an inlet (not shown) for unpurified water and an outlet 11 through which purified water can issue. Located within the housing and arranged so that the water purification can pass successively through them is a reverse osmosis pre-filter cartridge which comprises a thin film membrane for deionising the raw feed water, a tank for receiving water from the reverse osmosis cartridge, a pump connected to the outlet of the tank for circulating water, an organic adsorption cartridge, an ion exchange unit containing ion exchange resins, a membrane cartridge containing a micro-filter for removing trace colloidal organics and a line cell, the line cell being coupled to the outlet 11.

The outlet 11 as shown in FIG. 1 has connected thereto a flexible conduit 14 which extends to a manually manoeuvrable dispensing element indicated by the reference numeral 16. The dispensing element has a main body portion which is cylindrical and carries a nozzle which, when the dispensing element is not being used, is accommodated in a recess 17 formed in a shelf 18 on the lower part of the housing 10. The conduit 14 accommodates two water carrying pipes which extend from the outlet 11 to the dispensing element 16. Disposed within the housing 10 adjacent the recess 17 but not shown in FIG. 1 is a unit for generating ultra-violet radiation. The dispensing element 16 can be removed from its recess in the housing and moved to any appropriate position within the limits defined by the flexible conduit 14. The dispensing element includes a valve which can be operated to allow water to flow through its nozzle.

The dispensing element is shown in more detail in FIG. 2 of the drawings. This Figure shows that the dispensing unit comprises a cylindrical housing 20 having a through bore 21 which has a larger diameter portion at its upper and lower ends. The upper larger diameter portion accommodates the neck of a plunger cap 22. The plunger cap is carried on a spindle 24 which extends through the through bore 21 of the housing 20. A spring 25 is located in an annular space between the spindle 24 and the neck portion of the cap 22 and normally biases the cap upwardly. The lower end of the housing 20 is connected by an adaptor unit 26 to a valve body 27. The valve body 27 is disposed axially with the housing 20 and has a radially extending short tubular portion 28 which accommodates tubes 29 and 30 and can be coupled to the conduit 14. The tubes 29 and 30 are carried by a disc 31 which fits snugly within the portion 28. The lower portion of the valve body 28 is connected by an adaptor 32 to the nozzle 34.

The lower end of the spindle 24 is connected to a further spindle 35 which extends downwardly through the valve body 27. The connection between the two spindles comprises a threaded pin 36 on the upper end of the spindle 35 which engages a tapped axial bore 37 in the lower end of the spindle 24. The relative axial position of the two spindles can be adjusted by rotation one relative to the other. The lower end of the spindle 35 extending through a disc shaped sealing element 38 which forms a seal between the adaptor 32 and the upper end of the nozzle 34. The sealing element 38 forms a valve seat for a circular valve member 39 carried on the lower end of the spindle 35. The action of the spring 25 is such as to normally urge the valve member 39 into engagement with its seat 38.

The short tubular member 28 is coupled to the flexible conduit (not shown in FIG. 2) which accommodates two tubes which are connected respectively to the tubes 29 and 30. One such tube allows water to flow from the housing 10 to the dispensing element 16 and the other allows water to flow back from the dispensing element to the housing.

The valve element 39 can be opened simply by manually depressing the cap 22 to move the spindle 24, the spindle 35 and the valve element 39 downwardly against the action of the spring 25. This moves the valve element 39 away from the valve seat 38 and thereby allows liquid within the valve body 27 to flow through the nozzle 34. The degree to which the valve member 39 opens can be varied by rotating the cap 22 and hence the spindle 24.

Figure 3:
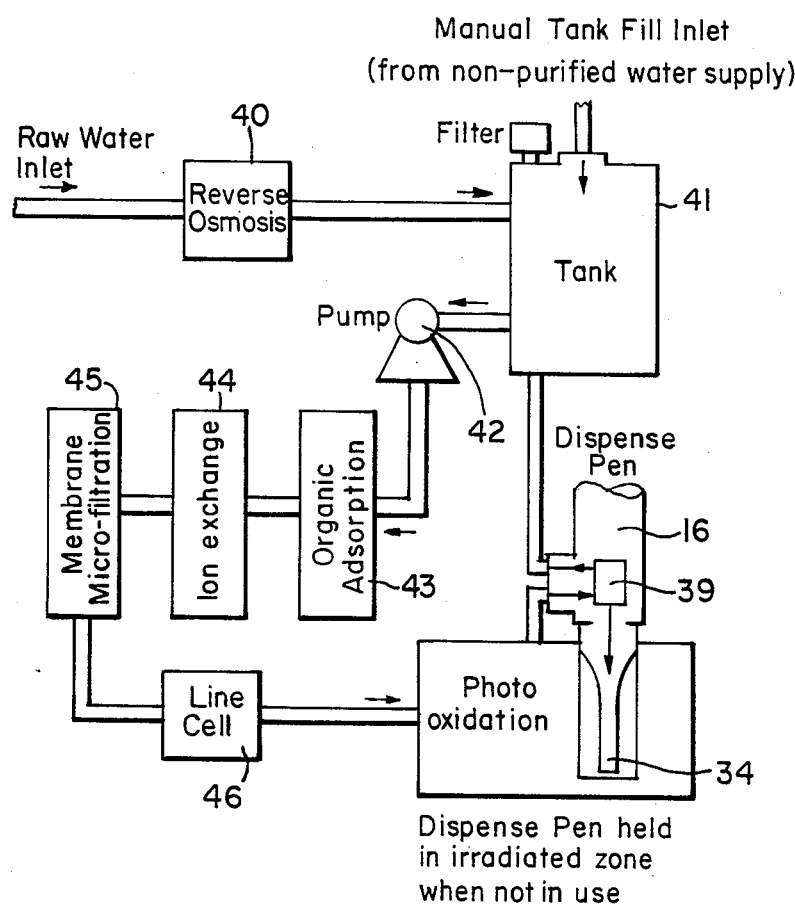
FIG. 3 illustrates the operation of the apparatus.

The operation of the apparatus will be described now with reference to FIGS. 1 and 2 and also with reference to FIG. 3 which schematically illustrates the flow of water within the apparatus. In FIG. 3 the reverse osmosis cartridge is shown schematically at 40, the tank at 41, the pump 42, the organic adsorption cartridge at 43, the ion exchange cartridge at 44, the micro-filtration cartridge at 45, and the line cell at 46. FIG. 3 shows the dispensing element 16 with its nozzle 34 located in its recess adjacent the ultra-violet radiation unit. The flow of water to be purified is through the reverse osmosis unit 40 into the tank 41 then through the organic adsorption unit 43, the ion exchange unit 44, the membrane micro-filter unit 45, and the line cell 46 to the dispensing element. From the dispensing element the water can flow back to the tank 41 as shown in FIG. 3. It should be noted that the flow path through the dispensing element is such as to permit irradiation of the flowing water from the ultra violet source. This circulation is maintained by the pump 42. Thus it will be seen that water is continuously circulating through the purification elements and thereby ensures that water cannot collect for example in the dispensing element and become re-contaminated. The flowrate of the recirculating water can be maintained at a rate which inhibits bacterial growth and recontamination.

When it is required to dispense some purified water the dispensing element 16 is lifted from its recess in the main housing 10 and moved to a convenient location within the confines allowed by the flexible conduit 14. Water can be allowed to pass through the nozzle of the dispensing unit simply by depressing the cap 22 as described above to open the valve 39. Thus the dispensing element can be used to dispense highly purified water into any appropriate vessel within a reasonable radius of the main housing 10. The flowrates through the nozzle can be adjusted by rotation of the cap 22 as explained above. A typical flowrate range is from 300 ml/min up to the maximum flowrate provided from the main housing 10. The valve 39 can if required be locked in a permanently open position by adjustment of the cap 22. This facility allows continuous rinsing or displacement of disinfection chemicals typically used during routine cleaning of the central purification housing 10.

When the required quantity of water has been dispensed the dispensing element can be replaced in the recess in the main housing. If necessary the ultra-violet radiation unit can be activated to subject the nozzle 34 to ultra-violet radiation for the destruction of any micro-organisms which may collect during periods of non-use.

The apparatus has been described in terms of water purification but it will be appreciated that it can be used to purify other liquids.

The apparatus as described has the following features which individually or in combination are novel:

A purification unit having a manoeuvrable dispensing element with an outlet valve which is coupled to the main unit by a flexible coupling. The dispensing element can be moved within a reasonable radius of the unit to allow purified water to be dispensed into an appropriate vessel.

A purification unit with a manoeuvrable dispensing element which can be decontaminated when not in use by irradiation with for example ultra-violet radiation.

Envisaged modifications are the provision of means for irradiating the main housing outlet with ultra-violet radiation. An optical fibre device could be provided in the conduit 14 for transmitted ultra-violet radiation to the interior of the dispensing element 16. The optical fibre device could also transmit optical radiation to permit illumination of the dispensing element.

As an alternative or addition to the ultra-violet unit an ultrasonic transducer could be located near the recess 17. This would permit irradiation of the dispensing element with ultrasound which can also destroy organisms.

Other possible variations are the provision of a disposable sterile pipette and electrical or steam heating of the tip of the nozzle 34.

The apparatus can be made from any material appropriate for water purification. For example the housing, conduit 14 and main body of the dispensing element 16 can be made from polypropylene. In the case of the nozzle 34 and recess into which it locates a commerically available PVDF has been found to be a particularly suitable material.

We claim:

1. Liquid purification apparatus comprising a main housing, liquid purification means located in said housing, an inlet to said main housing for liquid to be purified by said purification means, an outlet from said main housing for outflow of purified liquid, and a maneuverable dispensing element coupled to said outlet by an elongated flexible coupling means to allow purified water to be dispensed from the maneuverable dispensing element at locations selected by the user, said elongate flexible coupling means including two tubes, one said tube allowing purified liquid to flow from said main housing to said maneuverable dispensing element and the other said tube allowing the purified liquid flowing in said one tube which is not dispensed to flow back from said dispensing element to said main housing whereby the purified liquid is recirculated to prevent contamination.

2. Apparatus according to claim 1, wherein said dispensing element includes a manually operable valve for controlling flow of liquid from the dispensing element.

3. Apparatus according to claim 2, wherein the valve is adjustable to form a means for controlling the flow rate therethrough.

4. Apparatus according to claim 1 wherein said housing includes a receptacle for receiving said dispensing element.

5. Apparatus according to claim 4 including means for decontaminating said dispensing element, said decontaminating means being disposed adjacent said receptacle.

6. Apparatus according to claim 5 wherein said decontamination means comprises means for irradiating said dispenser with ultra-violet radiation.

7. Apparatus according to claim 1 wherein the apparatus is water purification apparatus.

* * * * *